(12) United States Patent
Massenet et al.

(10) Patent No.: US 12,196,438 B2
(45) Date of Patent: Jan. 14, 2025

(54) TEMPERATURE DIFFERENTIAL BASED FAN CONTROL

(71) Applicant: Schroff Technologies International, Inc., North Kingston, RI (US)

(72) Inventors: Christophe Massenet, North Kingstown, RI (US); Richard De Felice, North Kingstown, RI (US); David Therrien, North Kingstown, RI (US); Robert Paterson, North Kingstown, RI (US)

(73) Assignee: Schroff Technologies International, Inc., North Kingston, RI (US)

( * ) Notice: Subject to any disclaimer, the term of this patent is extended or adjusted under 35 U.S.C. 154(b) by 141 days.

(21) Appl. No.: 17/218,743

(22) Filed: Mar. 31, 2021

(65) Prior Publication Data

US 2021/0310680 A1 Oct. 7, 2021

Related U.S. Application Data

(60) Provisional application No. 63/003,663, filed on Apr. 1, 2020.

(51) Int. Cl.
*F24F 11/46* (2018.01)
*F04D 15/00* (2006.01)
(Continued)

(52) U.S. Cl.
CPC .......... *F24F 11/46* (2018.01); *F04D 15/0066* (2013.01); *F24F 11/63* (2018.01);
(Continued)

(58) Field of Classification Search
CPC .. F24F 11/46; F24F 11/63; F24F 11/76; F24F 2011/0002; F24F 2011/0006;
(Continued)

(56) References Cited

U.S. PATENT DOCUMENTS 4,094,166 A 6/1978 Jerles
4,362,026 A 12/1982 Miller
(Continued)

FOREIGN PATENT DOCUMENTS

CN 105091187 A * 11/2015 ............. F24F 11/30

*Primary Examiner* — Nelson J Nieves
*Assistant Examiner* — Matthew John Moscola
(74) *Attorney, Agent, or Firm* — Armis IP Law, LLC (57) ABSTRACT

A control system for ambient air exchange with a machine room or similar enclosure controls an exchange rate of the ambient air based on a temperature differential between the inside (machine room) and outside temperatures, rather than absolute thermostatic controls based solely on the interior temperature. A larger temperature difference between the inside and outside air means a greater cooling potential for the exchanged air. Ambient air exchange is performed by dampers/louvers/vents and a fan speed driving the air exchange. Control of the fan speed based on the temperature differential allows lower fan speeds for controlling the temperature when the temperature differential indicates ample cooling. Higher fan speeds, incurring additional electrical consumption and fan noise, are only needed when a relatively small differential limits the cooling ability of the exchanged air.

18 Claims, 6 Drawing Sheets

(51) Int. Cl.
*F24F 11/00* (2018.01)
*F24F 11/63* (2018.01)
*F24F 11/76* (2018.01)
*F24F 110/10* (2018.01)
*F24F 110/12* (2018.01)

(52) U.S. Cl.
CPC ............... *F24F 2011/0002* (2013.01); *F24F 2011/0006* (2013.01); *F24F 11/76* (2018.01); *F24F 2110/10* (2018.01); *F24F 2110/12* (2018.01)

(58) Field of Classification Search
CPC .... F24F 2110/10; F24F 2110/12; F24F 11/77; F04D 15/0066; F04D 25/166; F04D 27/004; F04D 29/582; F05D 2270/303; Y02B 30/70
See application file for complete search history.

(56) References Cited

U.S. PATENT DOCUMENTS

| | | | |
|---|---|---|---|
| 6,062,482 A | 5/2000 | Gauthier et al. | |
| 6,246,033 B1 | 6/2001 | Shah | |
| 8,770,493 B2 | 7/2014 | Therrien et al. | |
| 2004/0247449 A1* | 12/2004 | Ma | H02P 6/26 318/400.01 |
| 2005/0016189 A1 | 1/2005 | Wacker | |
| 2005/0150968 A1 | 7/2005 | Shearer | |
| 2006/0248904 A1 | 11/2006 | Ludwig | |
| 2007/0130976 A1 | 6/2007 | Akehurst et al. | |
| 2007/0194949 A1 | 8/2007 | Swarztrauber et al. | |
| 2010/0080713 A1 | 4/2010 | Douglas et al. | |
| 2012/0144850 A1 | 6/2012 | Hay | |
| 2015/0083813 A1 | 3/2015 | Chen et al. | |
| 2015/0180538 A1 | 6/2015 | Smith et al. | |
| 2016/0123623 A1* | 5/2016 | Deng | F24F 11/30 702/183 |
| 2016/0143181 A1* | 5/2016 | De Felice | F24F 11/46 700/278 |
| 2016/0143182 A1* | 5/2016 | De Felice | H05K 7/20172 454/333 |
| 2017/0159956 A1* | 6/2017 | Lewis | G06F 16/9537 |
| 2017/0292728 A1 | 10/2017 | Ushirosako et al. | |
| 2019/0383500 A1* | 12/2019 | Jung | F24F 3/044 |
| 2020/0158368 A1* | 5/2020 | Sullivan | F24F 11/63 |

* cited by examiner

TEMPERATURE DIFFERENTIAL BASED FAN CONTROL

RELATED APPLICATIONS

This patent application claims the benefit under 35 U.S.C. § 119 (e) of U.S. Provisional Patent App. No. 63/003,663, filed Apr. 1, 2020, entitled "TEMPERATURE DIFFERENTIAL BASED FAN CONTROL," incorporated herein by reference in entirety.

BACKGROUND

Utility enclosures for telecommunications and networking equipment often house network devices including computing, switching and other electronic equipment. These enclosures range in size from closets to stand-alone tower base structures, and may be mostly unattended, save for periodic maintenance or when alarm/alert conditions are triggered. Environmental conditions in the enclosures, while generally not as stringent as human occupied spaces, must still maintain temperature and humidity for promoting longevity of the equipment, the loss of which would often entail a considerable expense. The equipment in the enclosures often emits substantial heat, due to the typically dense arrangement of the devices, and generally requires mechanical HVAC (Heating, Ventilation and Air Conditioning) systems for maintaining environmental parameters within appropriate ranges. U.S. Pat. No. 8,770,493, entitled "Telecom Shelter Cooling and Control System" proposes a supplemental alternative to purely mechanical heating/cooling approaches through the use of ambient air exchange when outside conditions permit. This allows a fan-driven exchange of cooler outside air with the enclosure as an economic alternative to mechanical compressor driven AC (or electric heat).

SUMMARY

A control system for ambient air exchange with a machine room or similar enclosure controls an exchange rate of the ambient air based on a temperature differential between the inside (machine room) and outside temperatures, rather than absolute thermostatic controls based solely on the interior temperature. A larger temperature difference between the inside and outside air means a greater cooling potential for the exchanged air. Ambient air exchange is performed by dampers/louvers/vents and a fan driving the air exchange. Control of the fan speed based on the temperature differential allows lower fan speeds for controlling the temperature when the temperature differential indicates ample cooling. Higher fan speeds, incurring additional electrical consumption and fan noise, are only needed when a relatively small differential limits the cooling ability of the exchanged air.

Configurations herein are based, in part, on the observation that modern infrastructure for various telecommunications and network transport of voice and data requires widespread deployment of devices in various locations and climates. Often these devices are housed in sparsely visited machine rooms or enclosures, expected to be primarily autonomous except for preventative maintenance. Unfortunately, conventional approaches to machine room environmental control can result in inefficient operating patterns that are detrimental to the HVAC equipment and to the enclosure devices should the HVAC fail. Even when ambient air exchange is employed, continued operation of air exchange fans can increase machine cycles and electrical costs when the ambient air is not sufficiently cooler and/or when the machine room is already within appropriate temperature limits. Accordingly, configurations herein substantially overcome these shortcomings by teaching an ambient exchange control system for mitigating excessive operation and noise resulting from unnecessary air turnovers. Fan speed or replacing internal machine room air with ambient air is controlled based on a temperature differential between a machine enclosure temperature and an ambient air temperature. The examples herein generally define an HVAC demand in terms of cooling, however it should be noted that analogous principles apply for heating when the machine room is located in a more frigid locale.

In a machine enclosure, a method of controlling fan speed driving an ambient air exchange for maintaining a temperature of the machine enclosure includes controlling a fan speed based on a temperature differential between a machine room temperature and an intake air temperature of received ambient outside air. Fan speed is controlled based on a temperature differential between inside and outside air, rather than conventional approaches which look only at the machine room temperature. This provides an effective "cooling value" of the outside air for identifying when a lower fan speed still provides sufficient cooling, or when a heat load and higher outside temperature require a more aggressive exchange to remain within operating limits.

The supplemental effect of the ambient air exchange may require a handoff to the native HVAC system when outside air is no longer cooling effectively. Accordingly, the controller determines when the ambient air exchange becomes ineffective at maintaining the machine room temperature, and invokes a mechanical HVAC device (typically compressor based cooling) for maintaining the machine room temperature. Nonetheless, a further feature of the differential based operation is to extend the ambient air exchange as long as practical to defer the handoff to the electricity-hungry HVAC compressors. Accordingly, the differential based fan speed is increased as the machine room temperature approaches an upper limit, to achieve a maximum cooling from the ambient exchange before handing off to the native HVAC system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A machine enclosure for housing electronic equipment such as telecommunications hardware needs to maintain a conditioned space for proper equipment operation. Such machine enclosures may be referred to as machine rooms, telecoms enclosures and the like, and in general represent HVAC controlled spaces suited for computer and network hardware, typically for supporting telecommunications and related network information and media traffic. While sensitive to temperatures, electronic equipment operates over a much larger temperature range than a human conditioned space, and is typically more focused on cooling operations as the equipment itself tends to generate substantial heat. Previous approaches to temperature regulation in machine enclosures are discussed in U.S. Pat. No. 8,313,038, filed Nov. 20, 2012, entitled TELECOM SHELTER COOLING AND CONTROL SYSTEM," and U.S. patent application Ser. No. 16/417,874, filed May 21, 2019, entitled "VENTILATION CONTROL APPARATUS AND METHOD," both incorporated herein by reference. The former is directed to Direct Air Control (DAC) for drawing in outside air to supplement native HVAC temperature control. The latter controls the temperature over a range, rather than a single setpoint and/or tolerance as typical human occupied spaces are. The approach claimed herein extends such approaches by varying a fan speed driving air exchange to make efficient use of mechanical HVAC only when needed without introducing excessive humidity or harsh temperate changes from a high temperature differential of ambient outside air.

In an example configuration shown below, the temperature differential maps to a table of variations from the differential to determine an appropriate fan speed. The controller indexes a target delta temperature based on the machine room temperature, and computes a delta T offset from a shortfall in the temperature differential from the indexed target delta temperature. The delta T offset provides a variation in the temperature differential that can be tolerated, and therefore defines an operating band of temperature around which the fan operates. For a particular machine room temperature, the controller adjusts the fan speed based on the delta T offset as indexed in the target delta T table, shown further below. The temperature differential indicates the cooling value of the incoming air; the delta T offset indicates a temperature differential that is sought. This is mapped to an input for fan speed, such as a PWM (Pulse Width Modulated) control signal, to increase or decrease the rate of exchange based on the temperature differential. PWM is employed as an example AC motor control medium that is well suited to a fan speed, however any suitable variable speed control may be employed.

Figure 1:
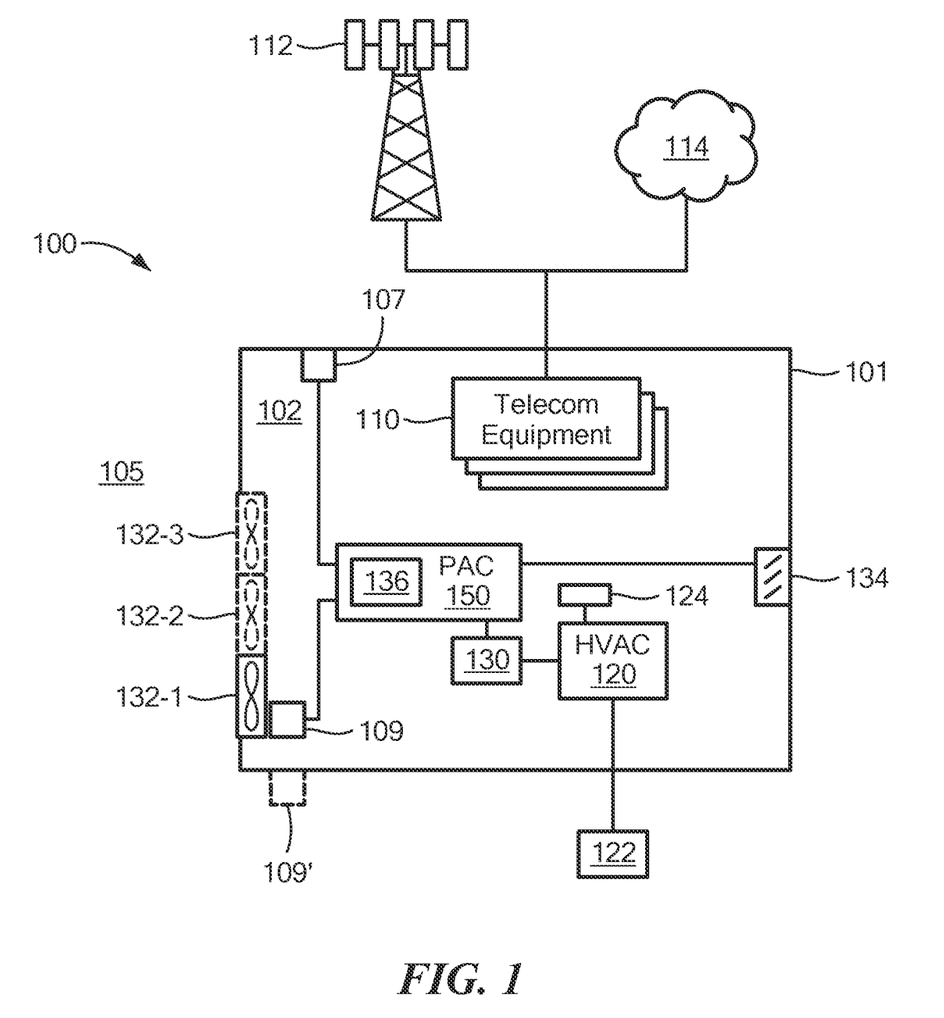
FIG. 1 is a context view of a machine or equipment room environment suitable for use with configurations herein.

FIG. 1 is a context view of a machine or equipment room environment 100 suitable for use with configurations herein. Referring to FIG. 1, in the machine room environment 100, the machine enclosure 101 defines a conditioned space 102 for maintaining telecommunication equipment 110 within a working temperature range. The telecommunication equipment 110 performs any number of a variety of tasks, typically including connection and transmission of information on a wireless 112 or wired 114 network such as the Internet.

The machine enclosure 101 or room includes a native HVAC system 120, including an outside compressor 122, heat exchanger 124 and fan, inside the enclosure 101, and a controller 130. The controller 130 engages the native HVAC system, often via a simple, low voltage (24V) connection commonly utilized for a conventional thermostat, and also implements direct air control (DAC) 150 by one or more fans 132-1 . . . 132-3 (132 generally) and an exhaust louver 134 or vent for exhausting machine room air in favor of ambient outside air drawn in by the fan 132. The fan 132 may be invoked (energized) according to control logic 136 that pulls in ambient outside air when a sufficient temperature differential exists to provide efficient cooling in lieu of the mechanical HVAC system 120. Conventional approaches would instead seek mechanical cooling as the unventilated enclosure builds heat from the equipment 110, even if the ambient outside air was substantially colder.

An internal temperature sensor 107, such as a thermistor or similar device, senses the temperature inside the machine room. Another temperature sensor 109 is on a fan tray or air intake for sensing the temperature of the ambient outside air 105. Alternatively, the ambient sensor 109' may be mounted outside. Either of these may have redundant or backup sensors for accommodating failure or air pockets inside the enclosure 101, discussed further below.

The control logic 136 further increase efficiency by running the fans 132 at a speed needed to effect proper cooling without excessive and air turnover. Running the fans more slowly yet still achieving sufficient cooling saves electrical energy and avoids temperature extremes that can lead to condensation, for example. The flowcharts below illustrate operation based on periodic measurement of temperature and motor speed control. Temperature is measured by thermistors or similar sensors, typically at the outside air intake and at one or more machine room locations. This may include designating one of a plurality of sensors in the machine room as an active sensor and employing the active sensor for determining the machine room temperature. Air exchange is moderated by controlling the fan speed, for example, by changing the PWM voltage signal or setting an input voltage or supplying a serial interface input supplied to a fan motor.

In general, the temperature differential represents the cooling value of the exchanged ambient air. The controller increases the fan speed as the computed delta T offset increases for drawing in additional ambient air to compensate for a decreasing temperature differential, since the outside air is not cooling as much. Conversely, the controller decreases the fan speed as the computed delta T offset decreases for moderating a volume of ambient air as the temperature differential increases, as when the outside air is cooling substantially as a result of a high differential. The target delta T table indicates this band for a given machine room temperature, such that the fan speed is based on the target delta T. In an example configuration, the table is defined by a GUI (Graphical User Interface) user parameter, which receives values for the table mapping the machine room temperature to the target delta temperature, and for indexing the target delta temperature based on the table.

Concurrently, upon invoking the mechanical HVAC compressors and/or other devices for cooling, the controller closes an ambient air exchange portal, or exhaust vent 134, for separating an environment of the machine room from the outside air and turning off the fan driving the ambient air exchange, to effectively seal off the now HVAC conditioned space in the machine enclosure 106. It should be noted that while the HVAC system coordinates both cooling and heating of the machine enclosure 101, ambient air exchange is unlikely to be invoked for increasing the temperature in the machine enclosure, i.e. in a heating context.

Figure 2:
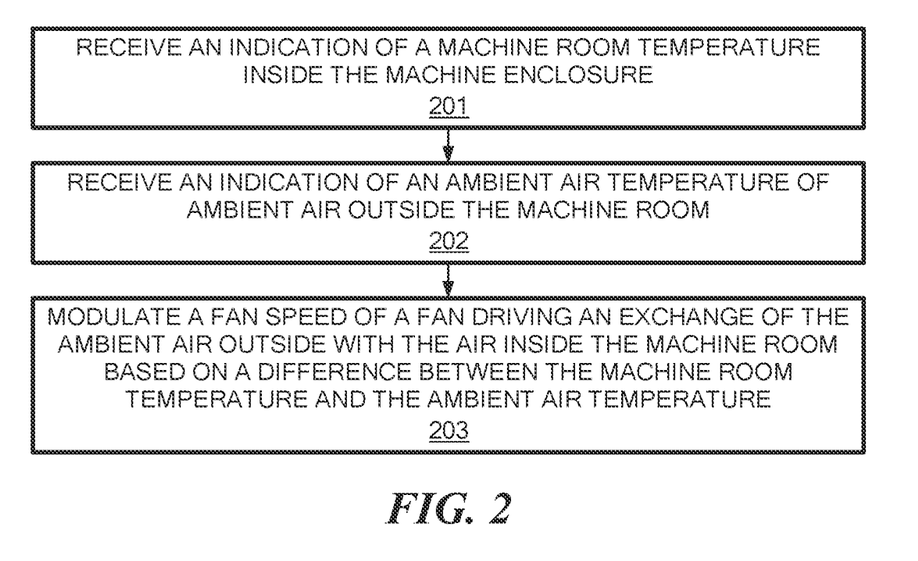
FIG. 2 is a flowchart of fan operation in the machine room of FIG. 1.

FIG. 2 is a flowchart 200 of fan operation in the machine room of FIG. 1. Referring to FIGS. 1 and 2, the method of controlling a machine enclosure internal temperature through an ambient air exchange as defined herein includes, at step 201, receiving an indication of a temperature of machine room air 102 inside the machine enclosure 101, and receiving an indication of an ambient air temperature of ambient air 105 outside the machine enclosure 101, as depicted at step 202. The controller 130 modulates a fan speed of the fan(s) 132-N driving an exchange of the ambient air 105 outside with the air 102 inside the machine enclosure 101 based on a difference between the machine room temperature and the ambient air temperature, as shown at step 203.

Figure 3:
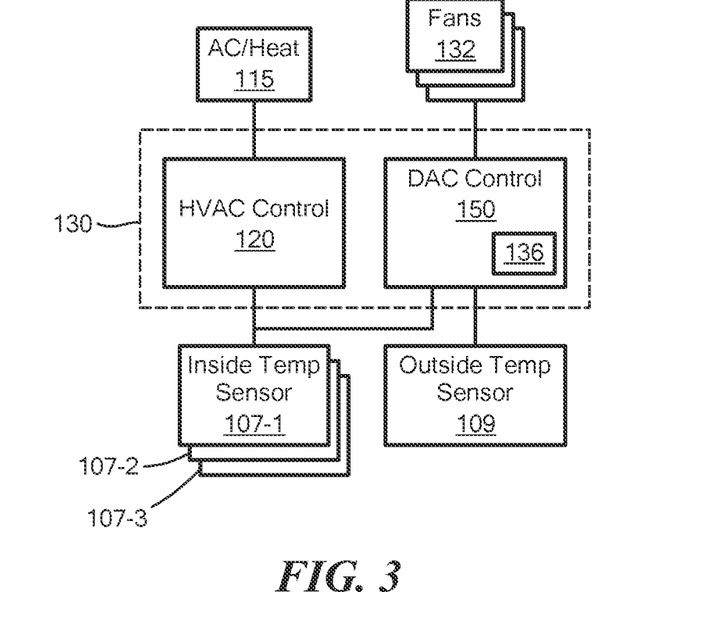
FIG. 3 is a block diagram of fan control based on the flowchart of FIG. 2.

FIG. 3 is a block diagram of fan control based on the flowchart of FIG. 2. Referring to FIGS. 1-3, the controller 130 includes native HVAC control 120 and direct air control (DAC) 150. The DAC 150 includes control logic 136 for fan speed control as defined herein. Inside sensors 107-1 . . . 107-N provide temperature sensing inside the enclosure 101, and one or more ambient air sensors 109 sense the temperature of the incoming ambient air for exchange. Based on the temperature information, the control logic 136 controls the fan 132 speed for increased or decreased exchange of the ambient outside air 105. Modulating the fan speed based on the temperature differential, rather than an absolute outside temperature, limits air exchange for maintaining a relative humidity in the machine room at a non-condensing level, even when the thermal load inside the machine enclosure drops.

The control logic 136 determines when the ambient air exchange becomes ineffective at maintaining the machine room temperature, and invokes a mechanical cooling device such as air conditioning 115 for maintaining the machine room temperature. As the temperature differential narrows and the effectiveness of ambient air exchange degrades, control reverts to the native HVAC control 120 for air conditioning 115 and/or 115, defined by the HVAC equipment described above.

Figure 4A:
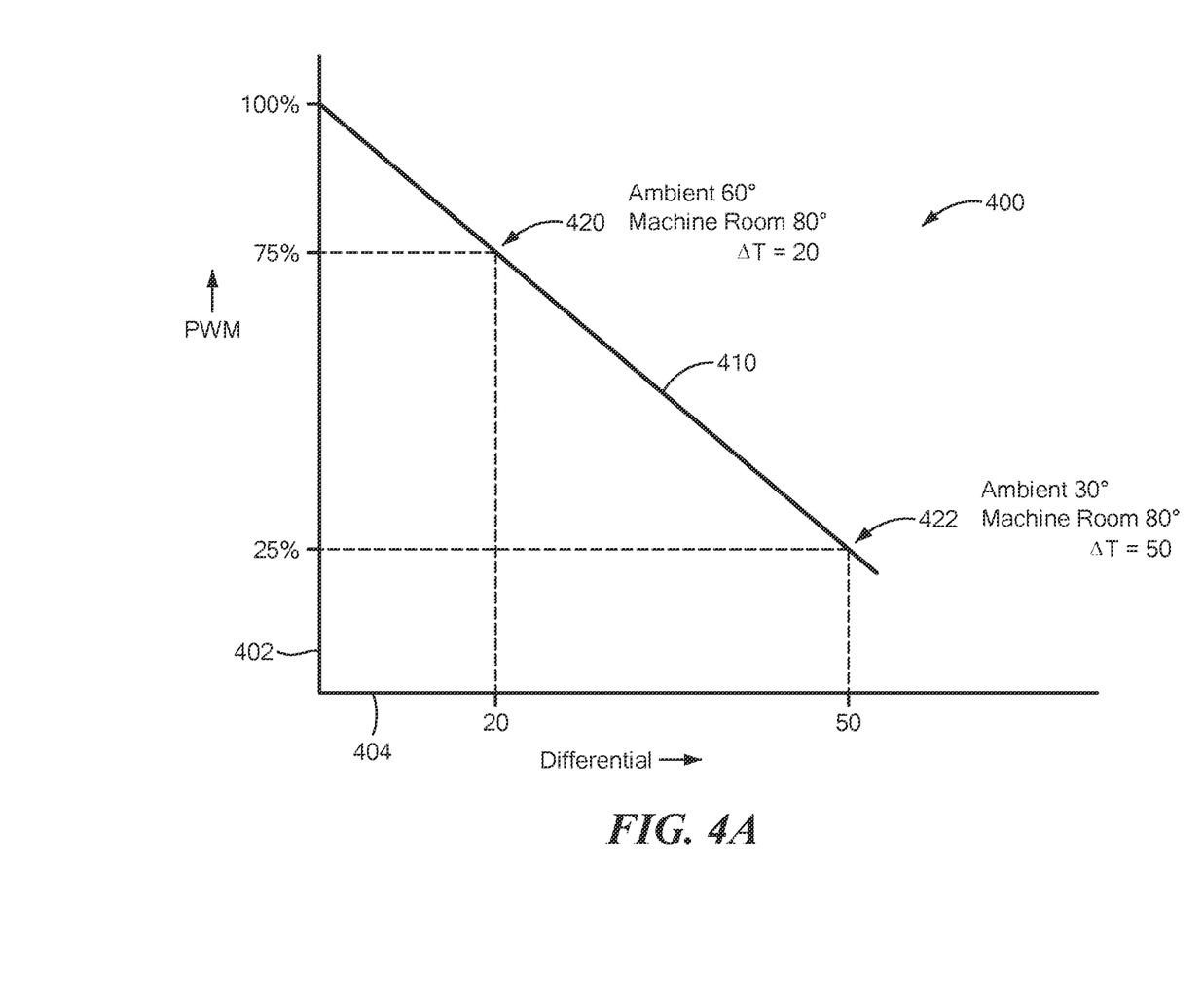
FIG. 4A is a graph of temperature response in the machine room of FIGS. 1-3.

FIG. 4A is a graph of temperature response in the machine room of FIGS. 1-3, and FIG. 4B is a GUI example for setting the temperature response. Referring initially to FIG. 4A, a graph 400 depicts temperature response in the machine enclosure 101 in response to the control logic 136. A vertical axis 402 depicts a speed of the fan motor as directed by the control logic 136. The axis 402 ranges from 0-100% of motor speed, typically as a PWM (Pulse Width Modulated) signal to the motor driving the fans 132. A horizontal axis 404 depicts the temperature differential between the temperatures of the conditioned space 102 and outside (ambient) air 105.

At a given temperature differential 404, the control logic 136 maps a fan speed 402 based on a speed curve 410. The speed curve 410 shows a linear response, however this may be augmented by a GUI configuration, shown further below in FIG. 4B. In general, the speed curve 410 demonstrates that a larger temperature differential 404 allows a slower motor speed 402, thus resulting in a reduced volume of ambient air exchange needed for cooling since the air provides greater thermal mass.

An example scenario shows an ambient air 105 temperature of 60° F. and conditioned space 102 temperature of 80° F., yielding a temperature differential of 20° F. Mapping this value to the speed curve 410 indicates a fan speed of 75% at position 420. Another example shows an ambient 30° F. temperature and a conditioned space 102 at 80° F., computing to a temperature differential of 50°. Since the differential is greater, a lower fan speed is needed for the same thermal effect. Accordingly, the mapped fan speed, given by point 422, is only 25%.

Figure 4B:
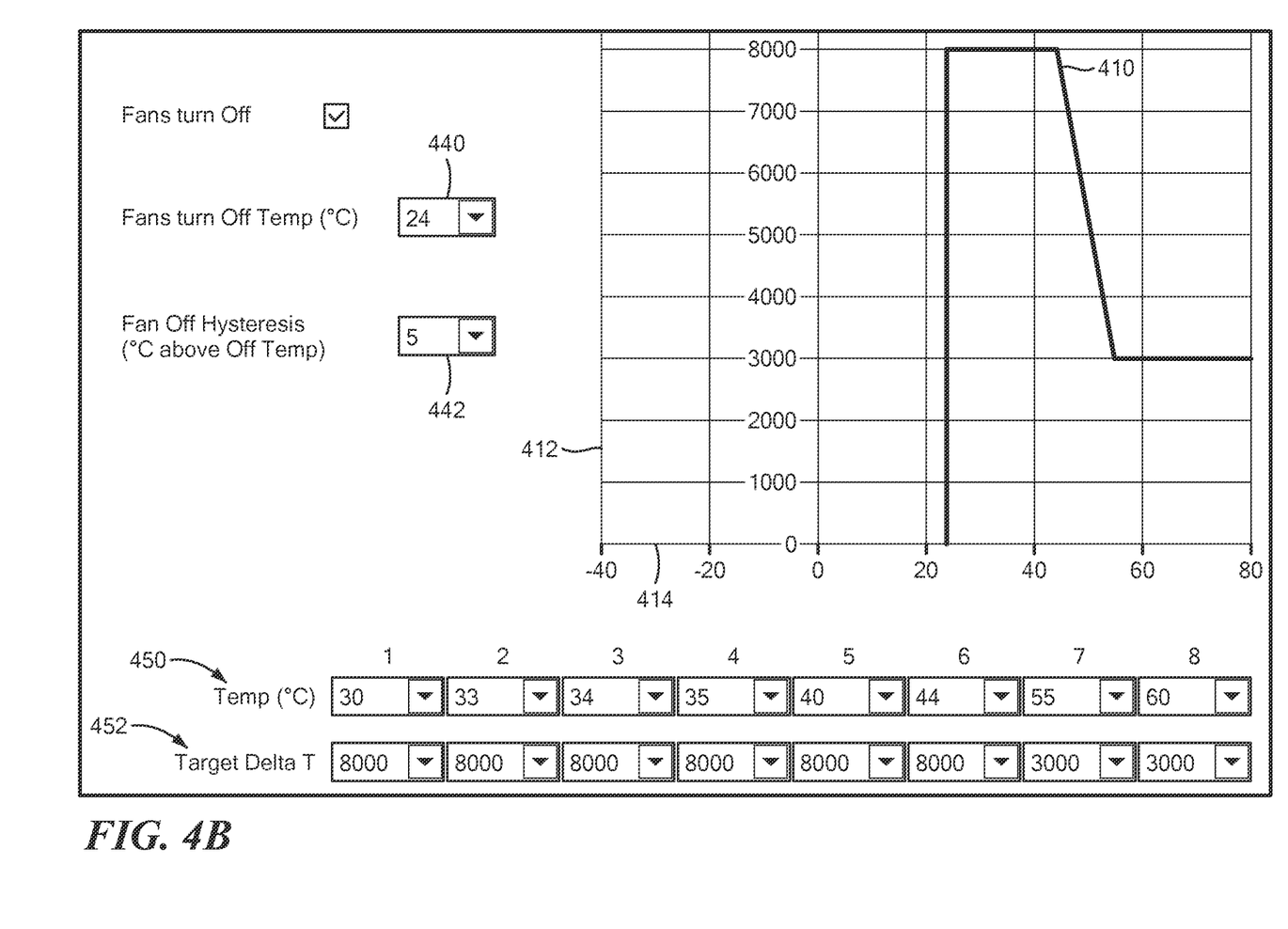
FIG. 4B is a GUI example for setting the temperature response.

FIG. 4B is an example for setting the speed curve and related parameters in a GUI for the controller 130. Referring to FIGS. 1-4B, the speed curve 410 is settable in a series of steps 452, each defining a particular temperature 450 along the speed curve 410, shown on the horizontal axis 414. At each step, a corresponding target delta T defines the temperature differential that should be sought, shown on the vertical axis 412. The resulting commanded fan speed is based on a delta t offset between the current temperature differential and the target delta T. The commanded fan speed increases if greater cooling, resulting from a greater delta T offset, is called for. A separate pull down 440 provided for a turn-off temperature, at which the air exchange is halted to define the temperature value at which the fans are not required to run as no cooling is necessary. Another pulldown 442 provides a hysteresis to avoid rapid on/off cycling as the system operates near the turn off 440 threshold.

Figure 5:
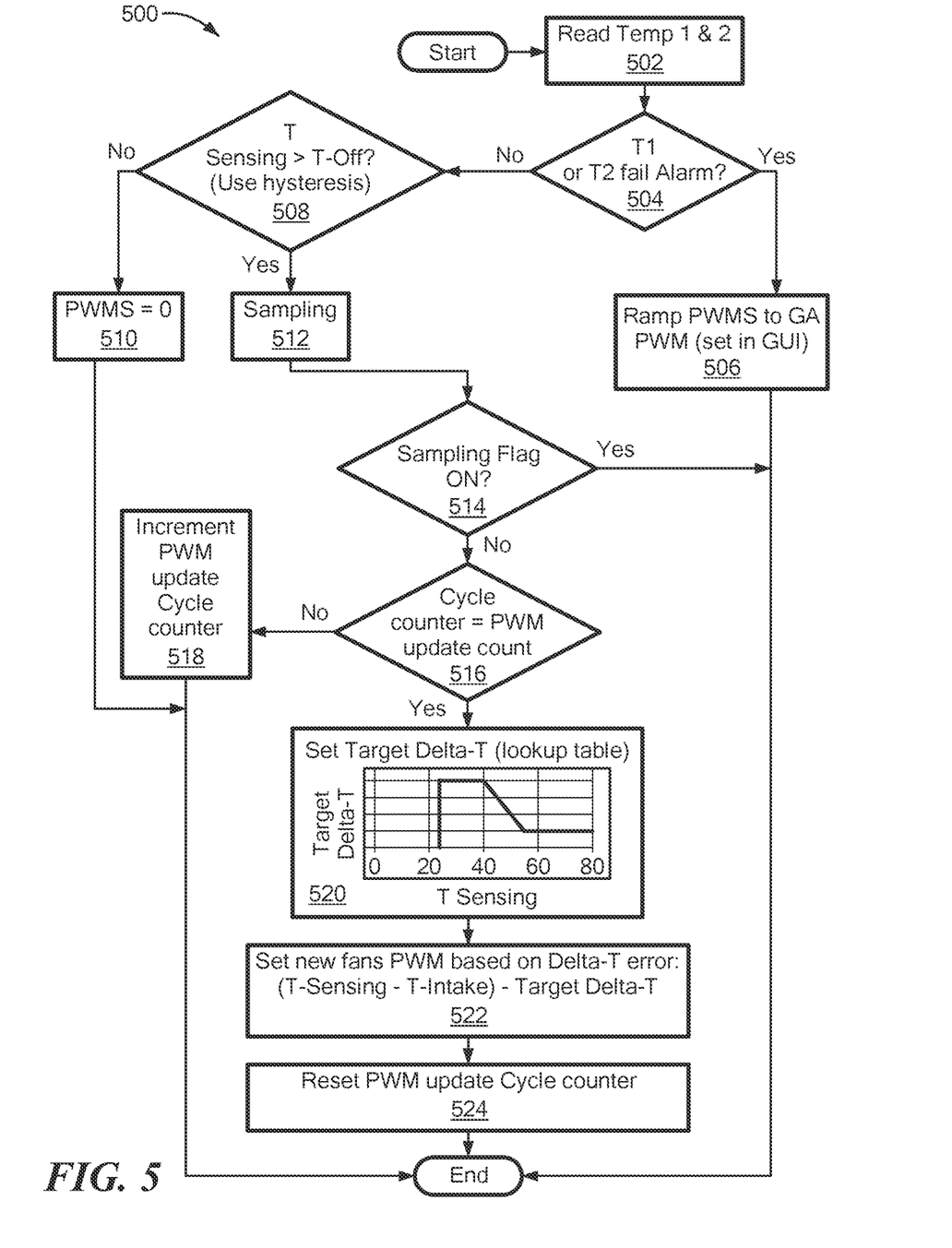
FIG. 5 is a flowchart of fan control in the machine room of FIGS. 1-3.

FIG. 5 is a flowchart of fan control in the machine room of FIGS. 1-3. Referring to FIGS. 1-5, in a particular configuration, the controller 130 launches a control application for activating the ambient air exchange (DAC) 150 and the native mechanical HVAC 120 system for maintaining the machine room temperature within a predetermined range. A full control loop considers both DAC and HVAC control for optimal efficiency. If called for, the control logic 136 in the DAC 150 determines, based on a temperature differential between the machine room temperature and the ambient air temperature; whether ambient air exchange is effective for maintaining the machine room temperature. If so, the control logic 136 iteratively compares an update counter in a control loop for determining whether a change to the fan speed is called for.

The controller 130 controls all aspects of the temperature in the machine enclosure, and therefore invokes both HVAC control 120 and DAC control logic 136 as needed, typically in an iterative or looping manner as various temperatures and other parameters are examined. In FIG. 5, a control loop 500 in the control logic 136 reads the internal temperature sensor 107 for determining the ambient air temperature of the conditioned space 102 in the machine room, and the temperature sensor 109 for outside air 105, as depicted at step 502. A check is performed, at step 504, for any detected failure that might compromise the equipment (i.e. runaway heating or cooling), and if so a remedial measure to fully ventilate occurs, at step 506.

The control logic 136 computes a temperature differential based on a difference between the machine room temperature and the ambient air temperature, as depicted at step 508. If the ambient air temperature is not above the fan shutoff specified by pulldowns 440 and 442, at step 508, the fans are turned off by issuing a PWM control of 0, as cooling is sufficient, as shown at step 510, and the loop exited.

Figure 6:
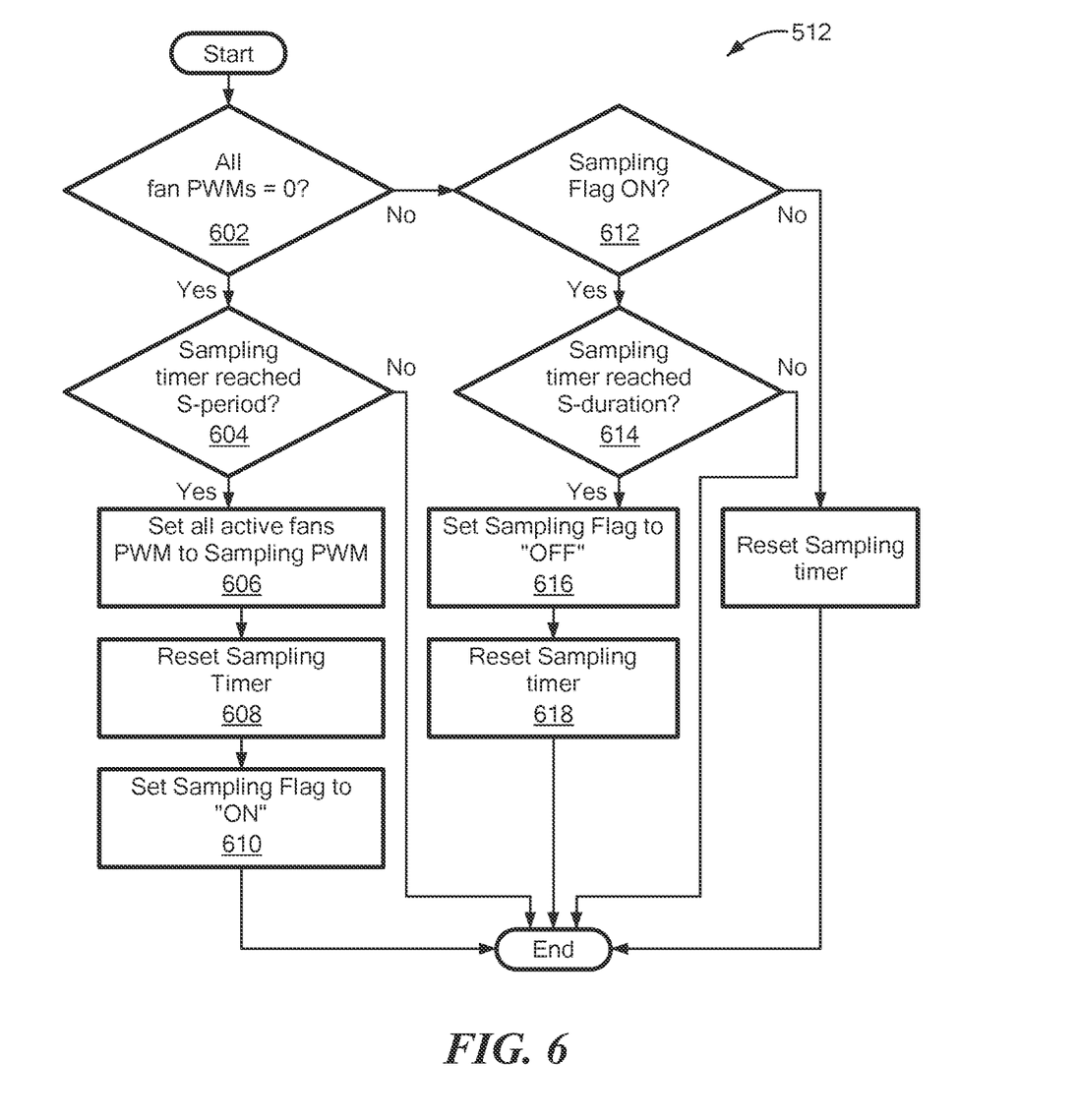
FIG. 6 is a flowchart of sampling intervals in the flowchart of FIG. 4.

Otherwise, sampling for hot/cold spots in the machine enclosure 101 occurs at step 512, discussed further in FIG. 6. Sampling occurs when all fans continue to be off since cooling is not called for. If the sampling flag is turned on in the sampling step 512, then the loop exits at step 514, otherwise a check is performed to determine if the fan speed, or PWM commands, should be updated, as depicted at step 516. Since the control loop 500 is part of a larger operating sequence, continual iterations are made, and not all iterations need to address fan speed or air sampling. Hence, a set of counters identifies which checks and controls should be interrogated during a given iteration. is updated. For example, if the main controller 130 loop cycle is set to 1 s., then a PWM count of 20 would update the PWM speed settings every 20 s. If fan speeds are not due for checking/updates, then the PWM counter is incremented at step 518 until successive iterations call for updated fan speed settings.

If the check at step 516 calls for an update, then the fan speeds are updated, as shown at step 520. This includes computing a temperature differential based on a difference between the machine room temperature and the ambient air temperature, and either decreasing the fan speed for decreasing a rate of ambient air exchange as the temperature differential increases, or increasing the fan speed for increasing a rate of ambient air exchange as the temperature differential decreases. A mapping is performed, based on the current temperature differential, using the speed curve 410. If needed, a new fan speed 402 is mapped based on the temperature differential (internal sensor 107—ambient temperate 109), and the mapped speed sent to the fan 132 as a PWM command based on the percentage of full speed, as shown at step 522. The PWM cycle counter is reset at step 524 for the next iteration.
not turned on.

During a period of ambient air exchange, such as overnight, the ambient air exchange may drive the machine room temperature below a shutoff temperature, meaning that ambient air exchange has satisfied the cooling demand. In this state, the controller deactivates the fan due to satisfaction of the machine room temperature in response to the ambient air exchange. Since the air is now dormant, the controller periodically cycles the fans to an activated state regardless of thermal demand to update each of the plurality of sensors based on thermal pockets and changing outside temperatures. This will force enough ambient air through to update the intake air (outside) temperature reading and the interior machine room temperature to alleviate any "hot spots" that may have evolved.

FIG. 6 is a flowchart of sampling intervals in the flowchart of FIG. 4. Referring to FIGS. 5 and 6, FIG. 6 shows a sampling operation that concludes that ambient air exchange is idle, meaning cooling is not called for. Sampling includes periodically energizing the fan for normalizing the machine room temperature by agitating stagnant air, computing the temperature differential based on the freshly agitated air to dissipate any hot or cold spots, and then reengaging the fans for ambient air exchange if called for.

From step 512, a check is performed, at step 602, to determine if the fans are idle (i.e. PWM controls at 0). If so, this means the controller 130 is in a sampling mode and the sampling timer is checked, at step 604. If the sampling timer indicates that the sampling period has expired, then the fans 132 are set accordingly, at step 606, the sampling timer reset (step 608), and the sampling flag set ON, at step 610, to commence an active sampling. Setting the fans for sampling means running at a low speed, such as 12%, to dissipate the machine room air to achieve a uniform temperature.

On the next iteration, since the fans are not OFF (but rather at a sampling speed), the sampling flag will be checked, as shown at step 612, and the sampling timer checked to see if a full sampling interval has been achieved (i.e. enough to uniformly distribute the machine room air 102), as shown at step 614. If not, sampling continues until the timer expires, and then at step 616, the sampling flag set to OFF at step 616 and the sampling timer reset, at step 618.

In the full machine room management context, the ambient air exchange described above performs direct air cooling and is coupled with a mechanical (compressor driven) HVAC system for heating and cooling when needed. The direct air cooling (DAC) is often an efficiency increasing complement to full range HVAC systems, which were common in conventional installations as the only environmental control. Several operating scenarios follow to illustrate.

In a typical operating scenario, ambient air exchange is likely to be most effective at night, when the ambient temperatures are cooler. Following sunrise, as the ambient temperature increases, ambient air circulation becomes more aggressive, cycling the fan around a temperature band defined by the delta T offset tolerated at a particular machine room temperature. Ultimately, native HVAC control will be invoked in view of the increasing cooling demand. A temperature of the machine room fluctuates during ambient exchange around a band defined by the delta T offset. The controller identifies when an operating band defined by the delta T offset and resulting fan speed results in an extended running cycle of the fans, and increases the fan speed for increasing ambient air exchange prior to invoking the mechanical HVAC cooling. Therefore, just prior to the limits of the ambient air exchange, the mapped fan speed may not be forcing a maximum amount of air, i.e. the PWM control value dictated by the target delta T value may not be the fan top speed. Upon detecting an upper limit to the temperature maintained by the ambient air exchange, fan speed may be increased to a maximum to force additional cooler air (based on the temperature differential) to extract as much cooling as possible from the ambient air prior to the compressor handoff.

The control loop provides an effective way to allow both the mechanical HVAC and DAC to alternate at appropriate times for achieving an efficient approach. Since the machine enclosures 101 are often unattended, an autonomous control is important. In an example scenario, the control 130 iteratively executes instruction in a control loop for assessing heating and cooling demand in the machine enclosure. The control loop evaluates, at each iteration, whether ambient air exchange or mechanical cooling is better suited for maintaining the machine room temperature in an operational range, and selectively invokes the ambient air exchange based on the evaluation. Evaluation including computing the temperature differential between the machine room temperature and the ambient air temperature when the ambient air temperature indicates an offset with a target machine room temperature.

When ambient air circulation is selected, the control loop determines when the ambient air exchange has cooled the air in the machine enclosure to a machine room temperature at or below a target machine room temperature, typically defined by a range of acceptable temperatures. Ambient air exchange is disengaged, and a sampling flag is set for commencing periodic sampling of the machine room temperature. The control loop reevaluates the machine room temperature upon expiration of a sampling interval, and when called for, reengages the ambient air exchange based on the machine room temperature following the sampling interval.

Another scenario includes determining that the machine room temperature is below a temperature threshold indicative of a cooling need, and therefore disengages the ambient air exchange based on the satisfactory machine room temperature. The machine room temperature is periodically reevaluated in the control loop.

Another typical scenario involves changeover to a mechanical HVAC when the daytime ambient temperature increases. The control loop determines that the temperature differential has limited an effectiveness of the ambient air exchange for reducing the machine room temperature, meaning that the ambient air exchange is approaching its limit for effective cooling. Just prior to the changeover, the control loop will run the fan at a maximum speed for increasing a cooling effect of the ambient air exchange. This extends the ambient exchange to pull maximum cooling from the ambient air, even if the speed mapping might have indicated less than full speed. The control loop then disengages the ambient air exchange in favor of activation of the HVAC system, likely until cooler temperatures return, such as sundown.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of controlling an internal temperature of a machine enclosure through an ambient air exchange, comprising:
   receiving an indication of a machine room temperature inside the machine enclosure;
   receiving an indication of an ambient air temperature of ambient air outside the machine enclosure;
   activating the ambient air exchange and a mechanical HVAC system for maintaining the machine room temperature within a predetermined range; and
   modulating a fan speed of a fan driving an exchange of the ambient air outside with the air inside the machine room based on a difference between the machine room temperature and the ambient air temperature;
   determining, based on a temperature differential between the machine room temperature and the ambient air temperature; whether ambient air exchange is effective for maintaining the machine room temperature; and
   iteratively comparing an update counter in a control loop in order to determine whether to change the fan speed.

2. The method of claim 1 further comprising
   determining when the ambient air exchange becomes ineffective at maintaining the machine room temperature; and
   invoking a mechanical cooling device for maintaining the machine room temperature.

3. A method of controlling a machine enclosure internal temperature through an ambient air exchange, comprising:
   receiving an indication of a machine room temperature of air inside the machine enclosure;
   receiving an indication of an ambient air temperature of ambient air outside the machine enclosure;
   computing a temperature differential, the temperature differential based on a difference between the machine room temperature and the ambient air temperature; and
   modulating a fan speed of a fan driving an exchange of the ambient air outside the machine enclosure with the air inside the machine enclosure based on the temperature differential by increasing the fan speed for increasing a rate of ambient air exchange as the temperature differential decreases.

4. The method of claim 1 further comprising:
   concluding that ambient air exchange is idle;
   periodically energizing the fan for normalizing the machine room temperature by agitating stagnant air;
   computing the temperature differential; and
   energizing the fan for ambient air exchange if called for.

5. The method of claim 1 further comprising modulating the fan speed for limiting air exchange for maintaining a relative humidity in the machine room at a non-condensing level.

6. A method of controlling an internal temperature of a machine enclosure through an ambient air exchange, comprising;
   receiving an indication of a machine room temperature inside the machine enclosure;
   receiving an indication of an ambient air temperature of ambient air outside the machine enclosure;
     performing a mapping of values from a table based on a difference between the machine room temperature and the ambient air temperature;
     modulating a fan speed of a fan driving an exchange of the ambient air outside with the air inside the machine room based on a mapped value from the table;
     iteratively executing instructions in a control loop for assessing heating and cooling demand in the machine enclosure;
     evaluating, at each iteration of the control loop, whether ambient air exchange or mechanical cooling is better suited for maintaining the machine room temperature in an operational range;
     selectively invoking the ambient air exchange based on the evaluation, the evaluation including computing a temperature differential between the machine room temperature and the ambient air temperature when the ambient air temperature indicates an offset with a target machine room temperature;
     determining when the ambient air exchange has cooled the air in the machine enclosure to a machine room temperature at or below a target machine room temperature; disengaging the ambient air exchange;
   setting a sampling flag for commencing periodic sampling of the machine room temperature;
   reevaluating the machine room temperature at an expiration of a sampling interval; and
   reengaging the ambient air exchange based on the machine room temperature following the sampling interval.

7. The method of claim 6 further comprising:
   determining that the machine room temperature is below a temperature threshold indicative of a cooling need;
   disengaging the ambient air exchange based on the machine room temperature; and periodically reevaluating the machine room temperature in the control loop.

8. The method of claim 6 further comprising:
determining that the ambient air exchange has approached a limit of cooling effectiveness;
running the fan at a maximum speed for increasing a cooling effect of the ambient air exchange; and
disengaging the ambient air exchange in favor of activation of the HVAC system.

9. A method of controlling a machine enclosure internal temperature through an ambient air exchange, comprising:
receiving an indication of a machine room temperature inside the machine enclosure;
receiving an indication of an ambient air temperature of ambient air outside the machine enclosure;
computing a delta T offset based on a tolerance from a target differential, the target differential based on the ambient air temperature; and
modulating a fan speed of a fan driving an exchange of the ambient air outside the machine enclosure with the air inside the machine enclosure based on a difference between the machine room temperature and the ambient air temperature.

10. The method of claim 9 further comprising increasing the fan speed as the computed delta T offset increases for drawing in additional ambient air as the temperature differential decreases.

11. The method of claim 9 further comprising decreasing the fan speed as the computed delta T offset decreases for moderating a volume of ambient air as the temperature differential increases.

12. A temperature controller device for a machine room enclosure, comprising:
an internal temperature sensor to receive an indication of a machine room temperature inside the machine enclosure;
an ambient temperature sensor for receiving an indication of an ambient air temperature of ambient air outside the machine enclosure;
a mapping table including a mapping of values for a fan speed based on a difference between the machine room temperature and the ambient air temperature and a controller having control logic to modulate the fan speed of a fan driving an exchange of the ambient air outside with the air inside the machine room based on a mapped value from the mapping table, wherein the control logic is further configured to:
compute a temperature differential, the temperature differential based on the difference between the machine room temperature and the ambient air temperature; and
increase the fan speed for increasing a rate of ambient air exchange as the temperature differential decreases.

13. The device of claim 12 wherein the control logic is further configured to:
determine when the ambient air exchange becomes ineffective at maintaining the machine room temperature; and
invoke a mechanical cooling device for maintaining the machine room temperature.

14. A temperature controller device for a machine room enclosure, comprising:
an internal temperature sensor to receive an indication of a machine room temperature inside the machine enclosure;
an ambient temperature sensor for receiving an indication of an ambient air temperature of ambient air outside the machine enclosure;
a mapping table including a mapping of values for a fan speed based on a difference between the machine room temperature and the ambient air temperature and a controller having control logic to modulate the fan speed of a fan driving an exchange of the ambient air outside with the air inside the machine room based on a mapped value from the mapping table, wherein the control logic is further configured to:
compute a temperature differential, the temperature differential based on the difference between the machine room temperature and the ambient air temperature; and
decrease the fan speed for decreasing a rate of ambient air exchange as the temperature differential increases.

15. The device of claim 12 wherein the control logic is further configured to:
activate the ambient air exchange and a mechanical HVAC system for maintaining the machine room temperature within a predetermined range;
determine, based on a temperature differential between the machine room temperature and the ambient air temperature; whether ambient air exchange is effective for maintaining the machine room temperature; and
iteratively compare an update counter in a control loop in order to determine effectiveness of the ambient air exchange for changing the fan speed.

16. The method of claim 1 further comprising: mapping the difference to a table of temperature differential and fan speed values for determining the fan speed.

17. A method of controlling a machine enclosure internal temperature through an ambient air exchange, comprising:
receiving an indication of a machine room temperature inside the machine enclosure;
receiving an indication of an ambient air temperature of ambient air outside the machine enclosure;
computing a temperature differential, the temperature differential based on a difference between the machine room temperature and the ambient air temperature; and
modulating a fan speed of a fan driving an exchange of the ambient air outside the machine enclosure with the air inside the machine enclosure based on the temperature differential by decreasing the fan speed for decreasing a rate of ambient air exchange as the temperature differential increases.

18. The method of claim 17, further comprising:
determining a high temperature condition indicated by the machine room temperature; and
invoking continuous fan operation to fully ventilate the machine room.

* * * * *

UNITED STATES PATENT AND TRADEMARK OFFICE
CERTIFICATE OF CORRECTION

PATENT NO. : 12,196,438 B2
APPLICATION NO. : 17/218743
DATED : January 14, 2025
INVENTOR(S) : Christophe Massenet et al.

Page 1 of 1

It is certified that error appears in the above-identified patent and that said Letters Patent is hereby corrected as shown below:

In the Claims

Column 10, Claim 6, Line 3, replace ";" with --:--

Signed and Sealed this
Twenty-sixth Day of August, 2025

Coke Morgan Stewart
*Acting Director of the United States Patent and Trademark Office*